United States Patent
Chulinin

(10) Patent No.: US 8,559,718 B1
(45) Date of Patent: Oct. 15, 2013

(54) DEFINING A LAYOUT OF TEXT LINES OF CJK AND NON-CJK CHARACTERS

(75) Inventor: Yuri Chulinin, Moscow (RU)

(73) Assignee: ABBYY Development LLC, Moscow (RU)

( * ) Notice: Subject to any disclaimer, the term of this patent is extended or adjusted under 35 U.S.C. 154(b) by 0 days.

(21) Appl. No.: 13/457,968

(22) Filed: Apr. 27, 2012

(51) Int. Cl.
*G06K 9/00* (2006.01)

(52) U.S. Cl.
USPC .......................................... 382/170; 382/185

(58) Field of Classification Search
USPC ......... 382/168, 170, 176–179, 181, 185, 186, 382/190, 203, 229, 225; 707/705, 736
See application file for complete search history.

(56) References Cited

U.S. PATENT DOCUMENTS

| | | | |
|---|---|---|---|
| 6,327,386 B1* | 12/2001 | Mao et al. | 382/186 |
| 8,077,973 B2* | 12/2011 | Dong | 382/186 |
| 2008/0002893 A1* | 1/2008 | Vincent et al. | 382/229 |

* cited by examiner

*Primary Examiner* — Duy M Dang

(74) *Attorney, Agent, or Firm* — LeighAnn Weiland; Aditya Krishnan

(57) ABSTRACT

A method is described for creating a scheme for dividing a text line of Chinese, Japanese or Korean (CJK) characters into character cells prior to applying classifiers and recognizing individual characters. Gaps between characters are found as a window is moved down the length of a text line. A histogram is built based on distances from the start of the window to a respective gap as the window is moved. The window is moved to the end of each gap after each gap is found and distances measured. This is repeated until the window reaches the end of the text line. A linear division graph (LDG) is constructed according to the detected gaps. Penalties for certain distances are applied. An optimum path is one with a minimal penalty sum and can be used as a scheme for dividing a text line into character cells.

20 Claims, 7 Drawing Sheets

DEFINING A LAYOUT OF TEXT LINES OF CJK AND NON-CJK CHARACTERS

FIELD

The present invention is related to functions traditionally associated with text pre-processing and optical character recognition (OCR) and specifically to segmenting lines and paragraphs and isolating handwritten and printed Chinese, Japanese and Korean (CJK) characters, glyphs or tetragraphs in images of documents containing CJK and other types of glyphic characters including documents compounded with characters of another language.

BACKGROUND

A document to be processed by OCR is initially and usually presented as an electronic image obtained from a camera, a scanner, or from conversion from one file format to another. In document processing, OCR is typically performed automatically or semi-automatically by a software program or a program module executed on a personal, mobile or other computer. However, there are many barriers to successful OCR, or OCR processing with a high degree of successful recognition, especially when attempting to recognize CJK and other types of glyphic characters.

Documents written by CJK speakers include characters of one or more glyphic languages and increasingly include non-standard characters (letters, symbols, numeral, punctuation marks) from one or more other languages including European languages. Such other non-CJK languages are generally based on a Latin, Cyrillic or other non-glyphic alphabet. Herein, reference is made to CJK characters, but such reference is shorthand for all varieties of glyphs, characters, tetragraphs, tetragrams, symbols, ideographs, ideograms and the like.

Written or printed text in a European language usually consists of repeated use of 100-150 standardized characters to form phonetic words. In contrast, texts in CJK languages usually use a subset of 30,000-40,000 available characters. A typical person routinely exposed to CJK characters encounters about 5,000 different CJK characters per day. Because of this characteristic of CJK and other glyph languages, it is difficult or impossible to recognize CJK texts by ordinary methods and techniques used in the recognition of characters and words in Roman, Latin or Cyrillic alphabets.

FIG. 1 is an example of an image of a document 100 that includes CJK text 102 (Japanese) in a horizontal direction and CJK text in a vertical direction. The CJK text 102 also includes Roman characters mixed with the CJK characters. The document 100 also includes a region 104 with a portrait or picture and a caption under the picture. FIG. 2 is an English translation 200 of the CJK text of FIG. 1.

While reading CJK characters is a relatively easy task for a person, a machine often has difficulty isolating and recognizing CJK characters. One difficulty arises when alphanumeric and other non-CJK characters are mixed into traditional CJK writing. Another difficulty arises when the direction of writing cannot easily be ascertained. CJK writing often does not include any punctuation. CJK writing may be in different directions on a single page of text. Further difficulties can arise when both traditional and simplified CJK characters are mixed together, as is often the case in formal printed publications.

There are various methods of attempting to overcome the difficulties in recognizing CJK characters. Analytically, recognition can generally be divided into two types of methods. The first type is by recognizing each character as it is being written—a form of online or active recognition. This type of recognition often involves analyzing strokes as they are entered by a stylus or finger on a touch-sensitive screen.

The second type of recognition involves segmenting individual CJK characters on each page of a document and then recognizing each character by matching it to a character in a database of characters. This type of recognition is termed offline recognition, and can be divided into handwritten character recognition (HCR) and printed character recognition (PCR). In each of these types of offline recognition, feature matching and/or structural analysis is performed. The techniques described herein apply to both HCR and PCR recognition, and generally to all types of offline and online recognition of CJK characters.

CJK characters generally occupy a square area in which the components or strokes of every character are written to fit. This technique allows CJK characters to maintain a uniform size and shape, especially with small printed characters in either sans-serif or serif style. The uniform size and shape allows dense printing of such CJK characters. However, the dense printing can be a source of trouble for segmenting and recognizing CJK characters, lines and paragraphs. There are many ways that segmenting, recognition and processing of CJK characters can be improved.

SUMMARY

Embodiments and techniques described herein include improved methods for segmenting and processing CJK and other types of glyphic characters ahead of other steps traditionally associated with recognition, computer recognition, or optical character recognition (OCR) of text. One result of segmentation is the successful isolation of each CJK character, glyph or tetragraph from the others. One such method involves finding or isolating a line of possible or potential CJK characters in an image of a page of text that includes CJK characters. The line of CJK characters may be horizontal or vertical. Slight line straightening or correction methods may be applied prior to, during or after implementing the methods described herein.

One implementation includes selecting or calculating a window width for a text line of CJK characters or CJK text. The window is at least as tall as the characters in the isolated text line. The beginning of the window is matched to the beginning of the text line and gaps falling in the window are detected. One way to find the gap is to identify a location in the window that is a 4-connected path that is purely vertical where contiguous white pixels are located directly one above another. A distance (e.g., in pixels) from the beginning of the window to each pixel belonging to the gap is calculated. A histogram is built based on these distances. The window is moved to the end of the first found gap and the process is repeated until the window reaches the end of the text line and all gaps in the text line are found.

Next, a linear division graph (LDG) is constructed according to the detected gaps. A histogram of character widths for the given line is obtained. A maximum or desired point in the histogram is found. In a neighborhood of the maximum, an area in the histogram is selected so that the height of each column in the selected area is at least a predefined part of the maximal height. Every column outside of this selected area is considered as a "small" penalty of the LDG arc. This area of small penalties is typically the character width for a given line.

Histogram columns that are outside of the selected area are considered as "special" penalties of the LDG arcs. Maximal special penalties generally correspond to the columns with maximal distances from the beginning of the window to the gap. LDG arcs are each assigned a small penalty or a special penalty according to analysis of the histogram.

Next, paths of the LDG are found, and a sum of the penalties for each path is calculated. LDG paths with transitions from "small" to "special" penalties or vice versa are additionally penalized for each such transition. The path with the minimal penalty sum is chosen or selected as an optimal path. The optimal path may be considered as a scheme for dividing a text line into character cells.

Other details and features will be apparent from the detailed description.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

DETAILED DESCRIPTION

In the following description, for purposes of explanation, numerous specific details are set forth in order to provide an understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments and techniques of the present invention disclose or relate to methods for defining of a layout of text lines containing Chinese, Japanese, Korean (CJK) and European characters. Reference may be made to a text "line," but also could refer to a word, paragraph, section and page. Similarly, while reference may be made to CJK characters, other terms may be used to mean CJK characters including glyphs, ideographs, tetragraphs, symbols and the like, and vice versa—use of CJK characters may be used to mean glyphs, ideographs, tetragraphs, symbols and the like. The embodiments and techniques described herein apply to all types of offline and online (active) recognition of CJK characters.

Unless stated otherwise, glyphic languages include Chinese (traditional and simplified), Japanese and Korean writings as well as any other written language that is not represented by a relatively simple or small alphabet. Reference is made to CJK characters and is shorthand for all varieties of glyphs, characters, tetragraphs, tetragrams, symbols, ideograms and the like. The embodiments and techniques are generally for isolating individual characters or groups of characters (e.g., paragraphs, lines, words and individual glyphs) for further processing associated with one or more recognition or OCR techniques. The present disclosure uses the following terms.

Figure 3:
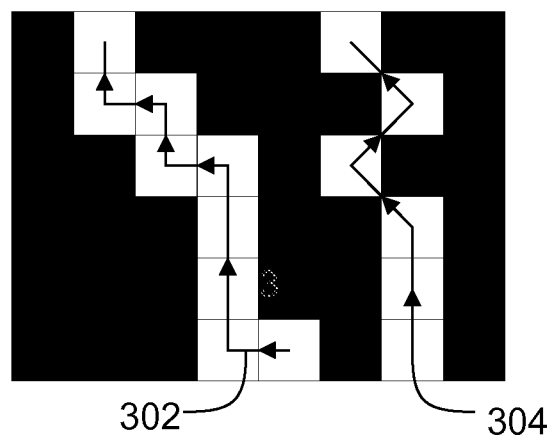
FIG. 3 shows an example of a 4-connected path 302 and a non-4-connected path 304.

A "4-connected path" is a set of pixels continuously connecting one point in an image with another point in the image, thereby every intermediate pixel borders with the previous one, on one of the four sides, and with the next one, on one of the three remaining sides. FIG. 3 shows an example of a 4-connected path 302 and a non-4-connected path 304.

Figure 4:
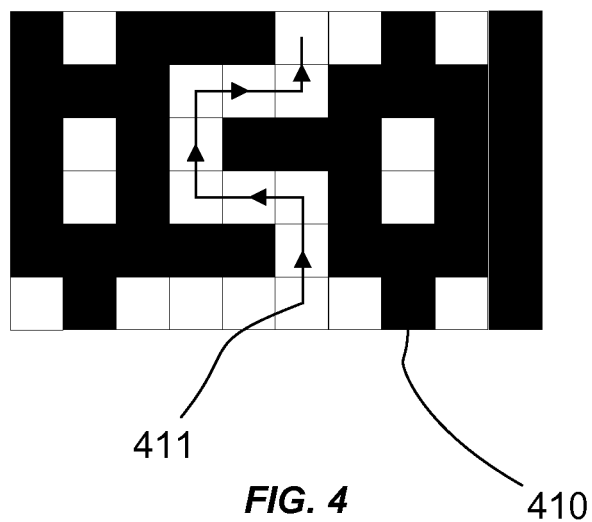
FIG. 4 shows an example of a gap 411 in the text string 410.

A "gap" is a space within a text line for which there is at least one 4-connected path in the text line between the highest (top) and the lowest (bottom) pixel of the text line. FIG. 4 shows an example of a gap 411 in a string of characters 410.

A "linear division graph" or LDG is a graph that could be constructed by a computer OCR system while recognizing a line of characters. The nodes of this graph are the gaps found within the text line—generally between each (future-recognized) character.

An "arc" of the graph is a hypothesis that there is a character between any two given gaps. Each arc of the graph is characterized with a numerical parameter (or optionally multiple numerical parameters) denoting a probability that the hypothesis is true.

A "classifier" is a programming module capable of calculating a predefined feature or a set of features for a given image fragment. A classification result generally is an estimation of probability of encountering a particular character within the given image fragment—the image fragment undergoing analysis by the classifier.

A "window" is an imaginary defined (and generally) rectangular frame with height of the frame generally equal to the height of the line of text or line of characters. The width and location of the window on the line can be different on each step of line processing, and with each particular line.

A "feature" is a mathematical function computed on a certain image fragment. A feature type and set of calculated features can be predefined. A feature may also take its ordinary meaning when referring, for example, to a "feature" of a character.

An "LDG path" is a sequence of arcs connecting the beginning and the end of a line of text (a true end, or a stopping point) and contains one or more sets of LDG nodes where an LDG node generally correlates with a gap between characters. In other words, LDG path is a variant of dividing a text line into characters at LDG nodes.

A "text line" generally is a rectangle consisting of pixels which includes images of characters in the text line that are destined to be recognized.

A "CJK line" is a text line corresponding to a text fragment containing only CJK characters (e.g., tetragraphs, glyphs).

A "mixed line" is a line corresponding to a text fragment containing both CJK characters and non-glyphic characters (e.g., Arabic numerals, Latin letters, punctuation marks). Examples of mixed lines can be seen in FIG. 1.

Before starting a recognition process, an initial image of a document (such as the one shown in FIG. 1) may be pre-modified, for example, by being binarized (transformed into 1-bit color space), deskewed, etc. The initial image also may be pre-analyzed in order to identify the following non-exclusive list of information: (1) a language or a set of languages of the text on the image; (2) geometrical parameters (e.g., length and height) of each image block containing a text line; and (3) absolute or relative coordinates of each image block containing a text line (e.g., relative coordinates of the upper left corner of each image block containing a text line with respect to the upper left corner of the initial image of the document).

Figure 5:
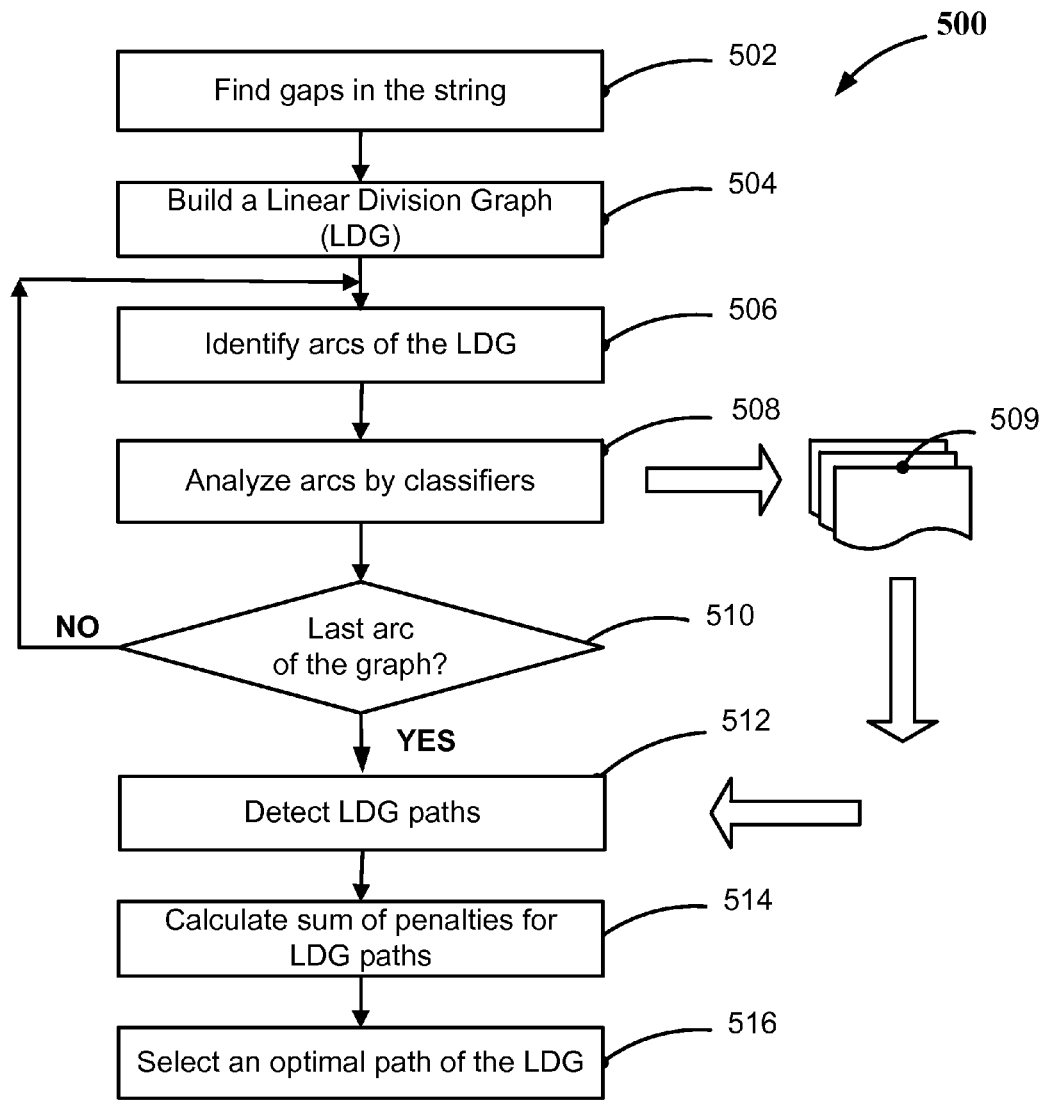
FIG. 5 shows a flowchart of operations to define a layout of an image of CJK text by a method usable for texts in European and other similar languages.

FIG. 5 is a flowchart 500 of operations to define a layout of an image of text strings by a method used for texts in European languages. Referring to FIG. 5, at step 502, gaps in the text line to be processed are detected. Then, at step 504 a linear division graph (LDG) is constructed according to the detected gaps. Next, arcs of the LDG are identified 506. Image fragments corresponding to all LDG arcs, turn by turn, are passed to a set of classifiers 508 for analysis The result of each turn is a set of hypotheses 509.

After the last turn of the processing cycle (steps 506 and 508), each arc of the LDG receives a penalty according to an estimation and hypotheses selected by the classifiers 508.

After penalties are calculated for all arcs in the LDG (510), LDG paths are detected 512, and a sum of the penalties for each of the paths is calculated 514. Finally, at step 516, the path with the minimal sum of penalties is selected as an optimal path.

The optimal path is considered a scheme for dividing a text line into character cells or positions. This optimal path is a result of text line recognition or processing. In other words, dividing a text line into character cells could be considered a part of the recognition process.

The method described in FIG. 5 works well for texts in European languages which usually consist of about 100-150 different or possible characters. In contrast, texts in CJK languages usually consist of about 30,000 to 40,000 different or possible characters and, correspondingly, these CJK texts need to use a set of 30,000 to 40,000 classifiers. However, this is computationally expensive. It is difficult to use the method described in FIG. 5 because of the requirement to use a huge number of CJK classifiers (e.g. a set of 40,000 classifiers). Moreover, the method described in FIG. 5 has the following drawbacks.

First, the method requires calculation or determination of a large number of LDG arcs. It is not possible to obtain a probability value for an LDG arc until the classifier processes all of the previous LDG arcs, i.e., those that connect the beginning of a line with its corresponding gap (the gap where the arc starts or ends). As a result, it is impossible to obtain the layout before running the classifier set. This is computationally expensive.

Second, it is impossible to define the line content before running the classifier, i.e., it is usually impossible to estimate or detect in advance if the line is mixed or contains only CJK characters. As a result, it is necessary to use both "European" and "CJK" classifier sets for each LDG arc.

Third, it is highly probable to encounter cases of incorrect dividing of a text line into character cells (positions for lines mixed with both Roman and CJK characters.

The method of the present invention overcomes the listed drawbacks. It provides significant acceleration of the OCR system, demands fewer computational resources and yields significantly fewer misrecognized characters.

Figure 6:
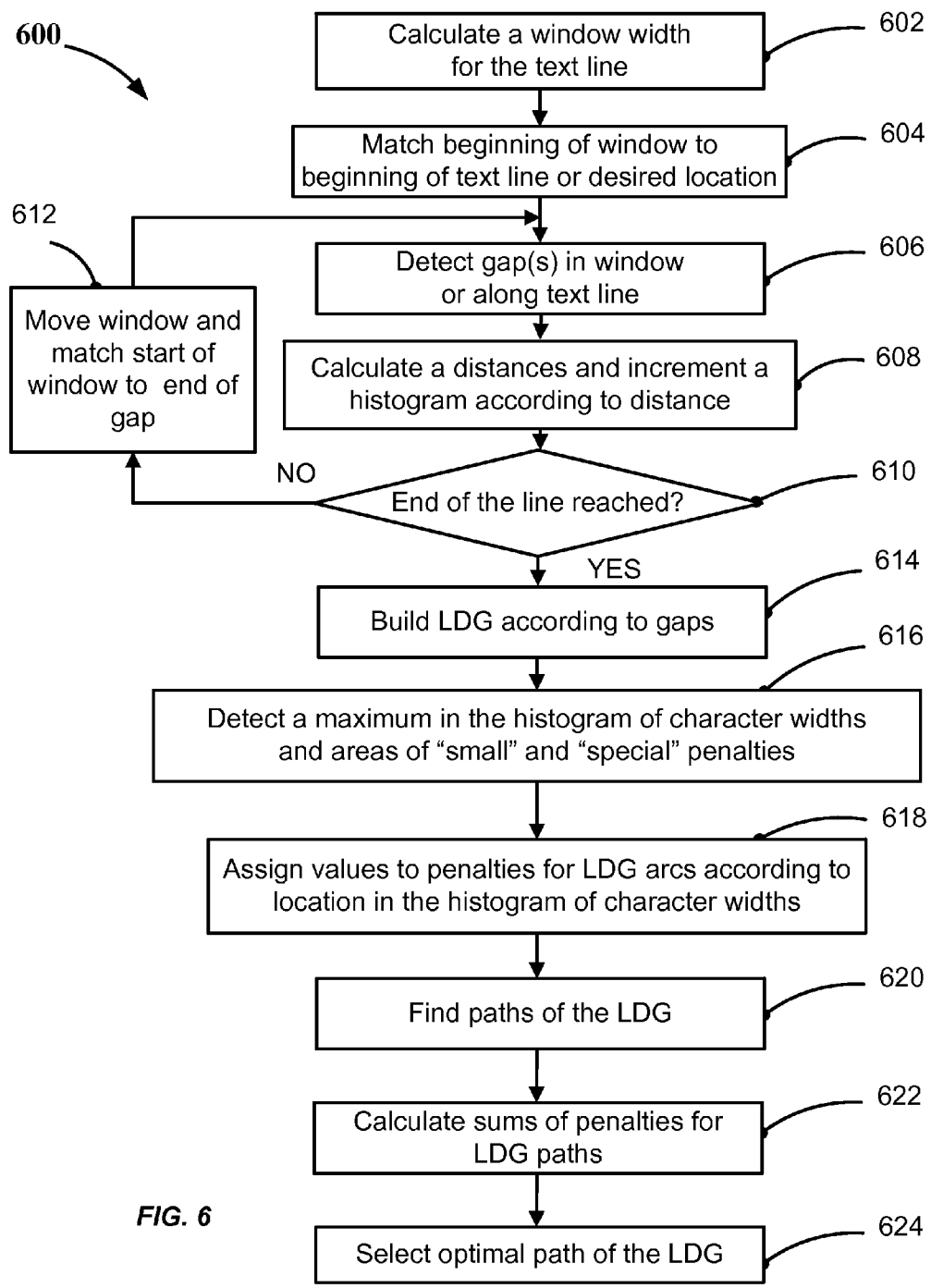
FIG. 6 shows a flowchart of operations to define a layout of an image of CJK text in accordance with an embodiment of the invention.

FIG. 6 shows a flowchart 600 of preferred operations to define a layout of the image of text strings in accordance with an embodiment of the invention when processing CJK texts.

At first, a window width is selected 602 such as by a function of a given text line height and as a function of a set of defined recognition languages. A window width is language-independent. For example, if the height of the line of Chinese glyphs is about 120 pixels then a window width is about 3 by 120 or about 360 pixels. The width of the window may depend on a line height or a font size, or may be chosen based on the same. A font size can be different on different lines or in different documents.

A histogram of character cell widths is a histogram showing frequencies of encountering a gap at a certain distance from the beginning of a window as measured, for example, horizontally along the width of the window. The more frequent (stronger indication) the gap (N pixels distant from the beginning of the window), the higher the N's column. Then, the text line is analyzed as follows.

The beginning of the window is matched to the beginning of the text line 604, and gaps falling in the window (i.e., located within the window's width) are detected 606. One way to find the gap is to identify a location in the window that is a 4-connected path that is purely vertical where contiguous white pixels are located directly one above another.

A distance (e.g., in pixels) from the beginning of the window to each pixel belonging to the gap is calculated. Columns of the histogram corresponding to the found distances are incremented 608.

In the next interation (if the end of the line is not reached 610), the window is moved and the beginning of the window is matched to the end of the found gap 610. Steps 606, 608 and 610 may be repeated until the window reaches the end of the text line 610 and all the gaps in the text line are found.

Then, at step 614, a linear division graph (LDG) is constructed according to the detected gaps.

A histogram of character widths for the given line is obtained. A considerable, obvious or pronounced maximum (or maxima) in the histogram is detected 616. In a neighborhood of the maximum, a histogram area is selected so that the height of each column in the selected area is at least a predefined part of the maximal height. Every column outside of this selected area is considered as a "small" penalty of the LDG arc with the height corresponding to this column. This area of small penalties is considered hereafter as a confirmed estimation of a typical character width for a given line.

Histogram columns that are outside of the selected area hereafter are considered as "special" penalties of the LDG arcs with the height corresponding to these columns. The value of a special penalty directly depends on the distance of the corresponding arc from the baseline of the window of CJK text. Maximal special penalties correspond to the columns with maximal distances from the beginning of the window to the gap.

In a preferred implementation, every LDG arc depending on its length is assigned a small or a special penalty according to the histogram of the character widths 618.

Next, the paths of the LDG are found 620, and a sum of the penalties for paths is calculated 622. LDG paths with transitions from "small" to "special" penalties or vice versa are additionally penalized for each such transition. The path with the minimal penalty sum is chosen or selected as an optimal path 624. Hereafter the optimal path is considered as a scheme for dividing a text line into character cells.

In other embodiments, another criteria system can be used instead of penalties to find an optimal path on the basis of highest probabilities.

As an additional benefit of using the described implementation, if the optimal path does not contain lines with a "special" penalty, the line layout with highest probability contains only CJK characters.

If the optimal path contains arcs with "special" penalties, the line fragments corresponding to these arcs with high probability contain characters that are not CJK characters (e.g, Arabic numerals, punctuation marks, Latin characters).

The results related to both line layout and preliminary interpretation of the characters contained there, are obtained without any traditional recognition of a character and without using any classifier.

There are many advantages associated with the above-described method. For example, there are fewer LDG arcs than in alternative methods such as the one shown in FIG. 5. Further, a probability estimation (i.e., penalty or <<special>> penalty) for every LDG arc can be obtained without any classifier. The described method provides fully a priori (without recognition of a character) text line layout and identification of character cells. The method enables obtaining a verified value of a typical character cell width for a given text line. The method also enables a program to define with high probability whether the text line is mixed or contains only CJK characters before starting a character classifying process. The method saves computational resources of a computer by starting only those classifiers that are necessary to recognize the given text. Therefore, it significantly accelerates the character recognition process for CJK texts. The method reduces to a negligible quantity the probability of errors when the arcs of the CJK text lines in a LDG with the maximal probability values do not correspond to real or actual character locations. The method significantly reduces the probability of encountering a situation where the arcs with the maximal probability values correspond to the CJK characters, when these places in the initial text contain characters of a European alphabet.

Figure 1:
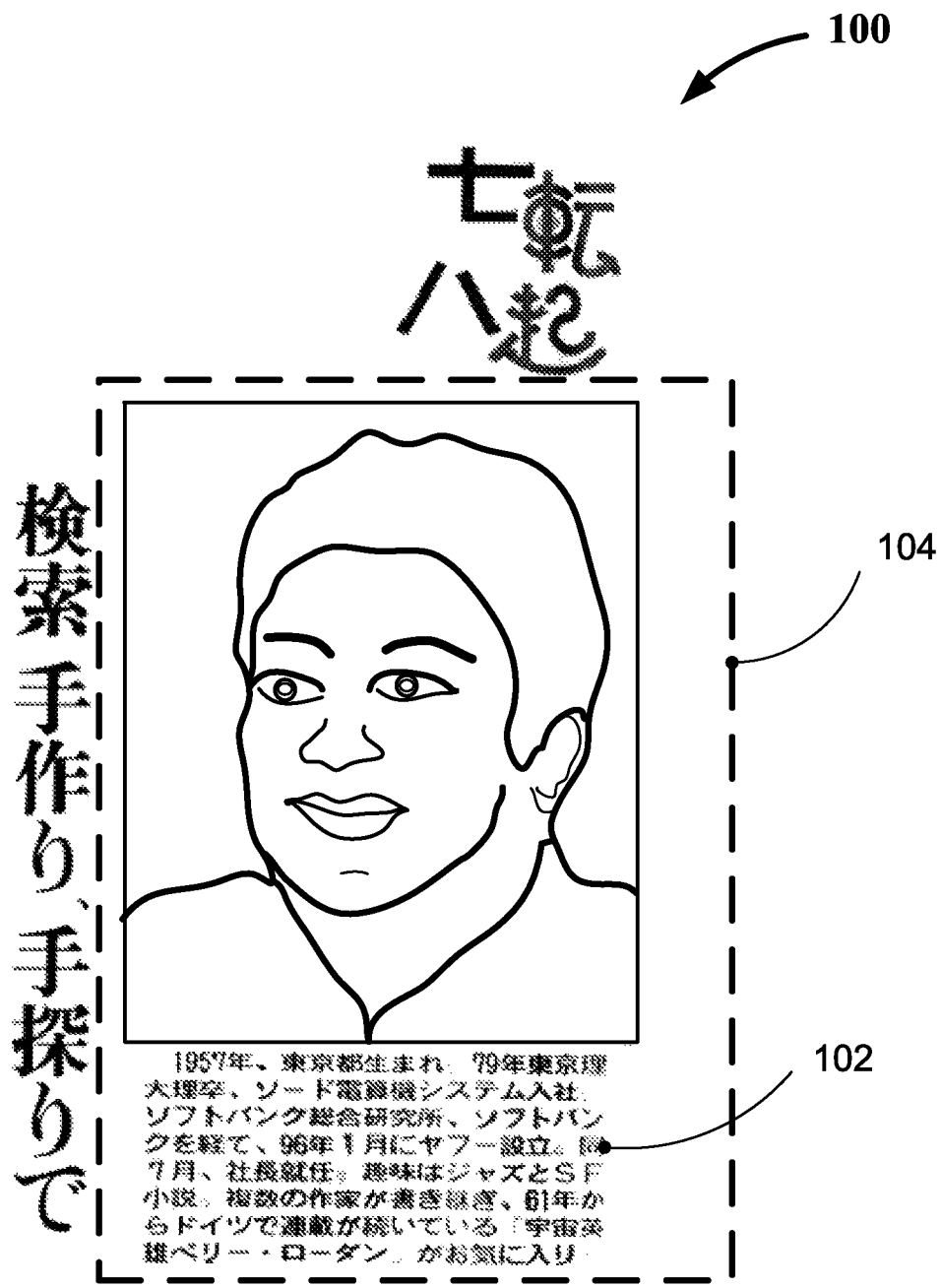
FIG. 1 is an example of an image of a document of CJK text 102 (Japanese) mixed with a few Roman characters.
Figure 2:
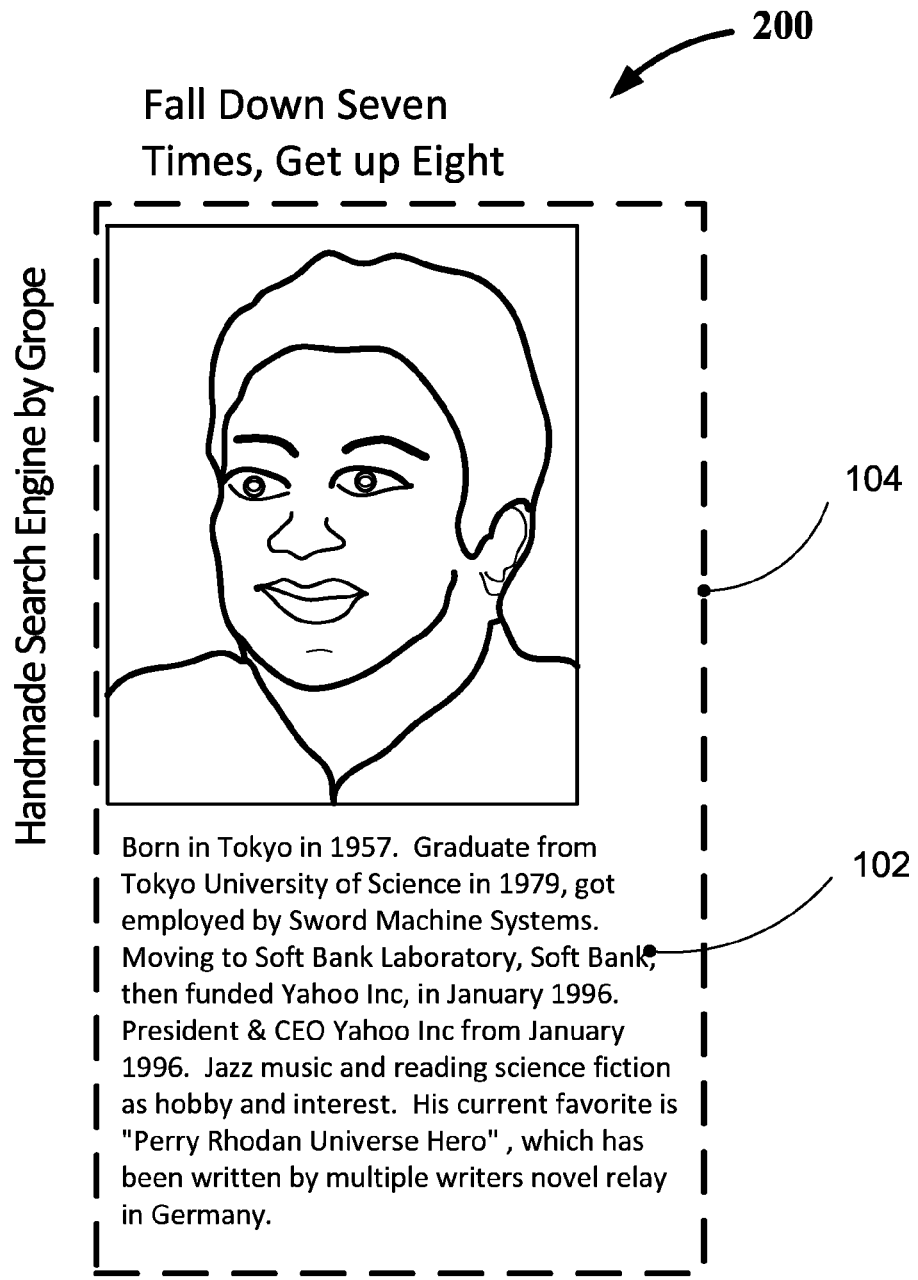
FIG. 2 is an English translation of the CJK text of FIG. 1.
Figure 7:
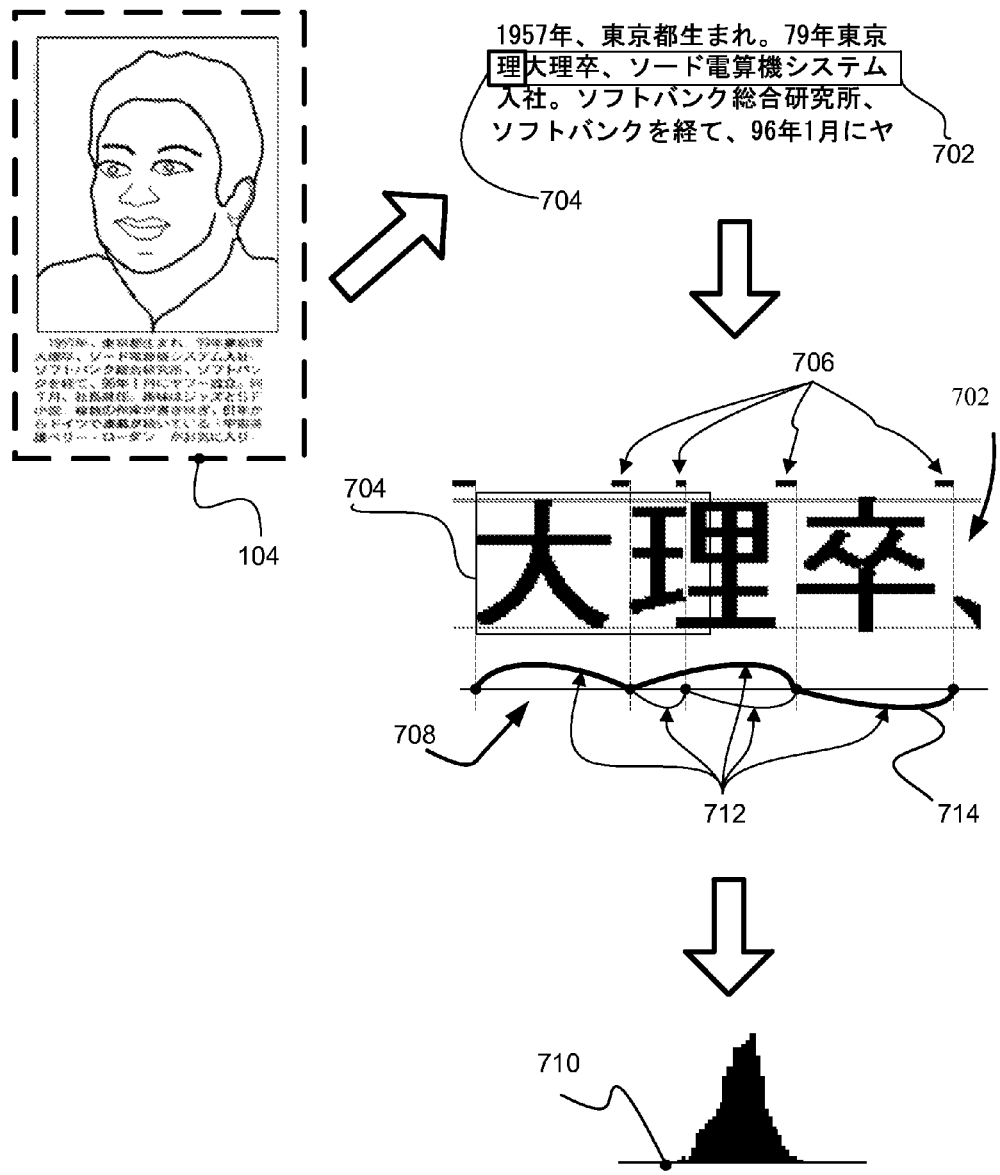
FIG. 7 shows an overview of the process shown in FIG. 6 with a portion of the image shown in FIG. 1.

FIG. 7 shows an overview of the process shown in FIG. 6 with a portion of the image shown in FIG. 1. With reference to FIG. 7, a portion of the caption under the portrait is identified. One row or line of text 702 is identified for processing. A window 704 is placed or oriented at a desired or starting place along the line of text 702. Gaps 706 are detected or identified in the line of text 702. Distances are calculated from starting points (a first side of a window 704) to the respective gap or gaps 706 (e.g., those within the window 704, or along the line of text 702). These values are tabulated into a histogram 710. An LDG 708 is build according to the gaps 706. Arcs 712 are generated and penalties are applied to the arcs where the penalties are related to the maxima in the histogram 710. Next, paths are found. An optimal path 714 (bold arcs on the drawing) is selected from a plurality of paths. An optimal path 714 can be selected from a numerical analysis of the line of text 702.

Figure 8:
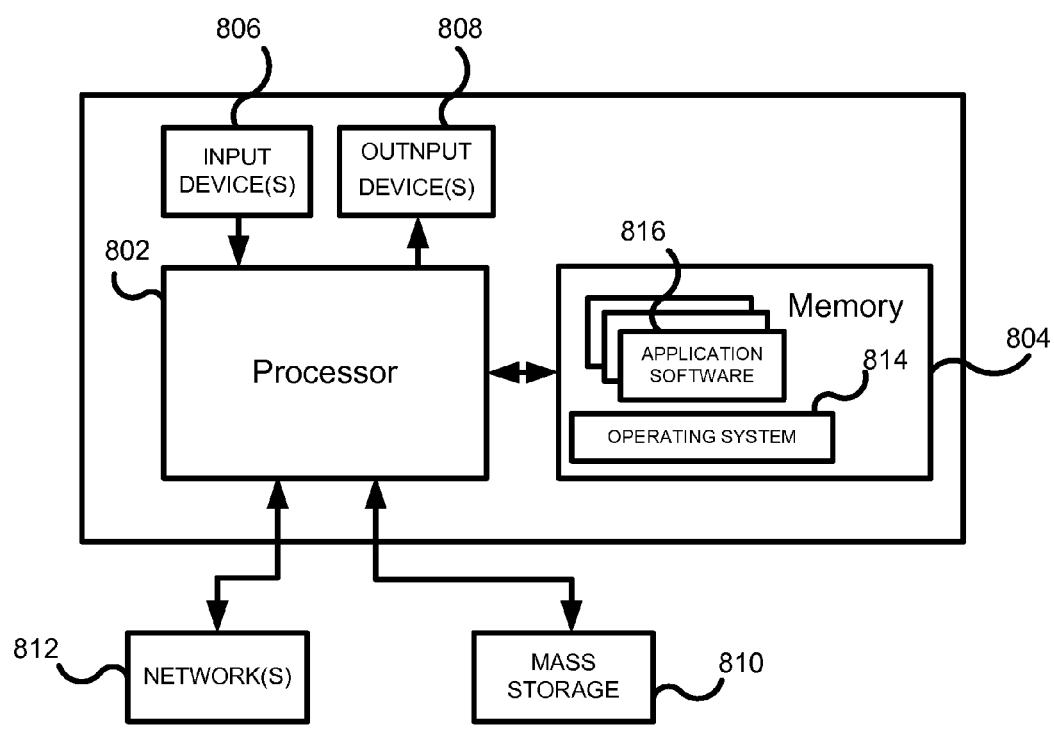
FIG. 8 shows exemplary hardware for implementing computer system in accordance with one embodiment of the invention.

Referring now to FIG. 8, an example of hardware 800 that may be used to implement the techniques disclosed herein is shown, in accordance with an embodiment of the present disclosure. The hardware 800 typically includes at least one processor 802 coupled to a memory 804. The processor 802 may represent one or more processors (e.g., microprocessors), and the memory 804 may represent random access memory (RAM) devices comprising a main storage of the hardware 800, as well as any supplemental levels of memory e.g., cache memories, non-volatile or back-up memories (e.g. programmable or flash memories), read-only memories, etc. In addition, the memory 804 may be considered to include memory storage physically located elsewhere in the hardware 800, e.g. any cache memory in the processor 802, as well as any storage capacity used as a virtual memory, e.g., as stored on a mass storage device 810. The hardware 800 also typically receives a number of inputs and outputs for communicating information externally. For interface with a user or operator, the hardware 800 may include one or more user input devices 806 (e.g., a keyboard, a mouse, a scanner etc.) and a display 808 (e.g., a Liquid Crystal Display (LCD) panel). For additional storage, the hardware 800 may also include one or more mass storage devices 810, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 800 may include an interface with one or more networks 812 (e.g., a local area network (LAN), a wide area network (WAN), a wireless network, and/or the Internet among others) to permit the communication of information with other computers coupled to the networks. It should be appreciated that the hardware 800 typically includes suitable analog and/or digital interfaces between the processor 802 and each of the components 804, 806, 808 and 812 as is well known in the art.

The hardware 800 operates under the control of an operating system 814, and executes various computer software applications, components, programs, objects, modules, etc. indicated collectively by reference numeral 816 to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

I claim:

1. A method for detecting the character cells in an electronic image, the electronic image including representations of glyphic characters, the method comprising:
    identifying a line of characters in the electronic image;
    detecting character gaps in the line of characters;
    creating a histogram of distances for the detected character gaps;
    constructing a graph according to the detected character gaps;
    assigning a penalty to arcs of the graph wherein the penalty is based in part on the histogram of distances; and
    selecting an optimal path in the graph associated with the character cells.

2. The method of claim 1, wherein the graph is a linear division graph (LDG), which is constructed by performing steps including:
    isolating values substantially near maxima values in the histogram of distances, wherein the isolated values are associated with respective detected character gaps;
    creating arcs for each detected character gap;
    assigning a penalty to the arcs;
    creating paths for the LDG;
    calculating aggregate penalties for each path associated with the LDG based on the penalties assigned to the arcs; and
    selecting a desired path from among the paths associated with the LDG based on the aggregate penalties associated with the paths.

3. The method of claim 1, wherein creating the histogram of distances for the detected character gaps includes:
    [1] setting, for a window, a window width for the line of characters;
    [2] orienting the window at a current target location associated with the line of characters;
    [3] using the detected character gaps, creating a histogram for the line; and
    [4] repeating steps [1], [2] and [3] for each identified gap.

4. The method of claim 3, wherein the window width is based in part on a line height of the line of characters.

5. The method of claim 3, wherein a first position of the window is a beginning of the line of characters in the electronic image.

6. The method of claim 1, wherein the character gap is a 4-connected path.

7. The method of claim 1, wherein the desired path is a path associated with a smallest value of absolute values of the aggregate penalties.

8. The method of claim 1, wherein the assigning of a penalty to the arcs includes assigning a first type penalty or a second type penalty to a respective arc based upon a position of the arc relative to a designated region in the histogram.

9. The method of claim 8, wherein the method further comprises:
    determining whether the line of characters includes non-CJK characters by detecting whether any of the arcs associated with the desired path have been assigned a second type penalty.

10. A device for detecting the boundaries of characters in an electronic image, the electronic image including representations of glyphic characters, the device comprising:
    a processor; and
    a memory configured with processor-executable instructions which, when executed by the processor, implement a method, the method comprising:
        identifying a line of characters in the electronic image;
        detecting character gaps in the line of characters;
        creating a histogram of distances for the detected character gaps; and
        constructing a linear division graph (LDG) according to the detected character gaps by performing steps including:
            isolating values substantially near maxima values in the histogram of distances, wherein the isolated values are associated with respective detected character gaps;
            creating arcs for each detected character gap;
            assigning a penalty to the arcs;
            creating paths associated with the LDG;
            calculating aggregate penalties for each path associated with the LDG based on the penalties assigned to the arcs; and
            selecting a desired path from among the paths associated with the LDG based on the aggregate penalties associated with the paths.

11. The device of claim 10, wherein creating the histogram of distances for the detected character gaps includes:
    [1] setting a window width for the line of characters;
    [2] orienting the window at a current target location associated with the line of characters;
    [3] using the detected character gaps, creating a histogram for the window; and
    [4] repeating steps [1], [2] and [3] for each identified gap.

12. The device of claim 10, wherein the character gap is a 4-connected path.

13. The device of claim 10, wherein the desired path is a path associated with a smallest value of absolute values of the aggregate penalties.

14. The device of claim 10, wherein the assigning of a penalty to the arcs includes assigning a first type penalty or a second type penalty to a respective arc based upon a position of the arc relative to a designated region in the histogram.

15. The device of claim 14, wherein the method further comprises:
    determining whether the line of characters includes non-CJK characters by detecting whether any of the arcs associated with the desired path have been assigned a second type penalty.

16. One or more physical non-transitory computer accessible media encoded with instructions for performing a method, the method comprising:
    identifying a line of characters in the electronic image;
    detecting character gaps in the line of characters;
    creating a histogram of distances for the detected character gaps; and
    constructing a linear division graph (LDG) according to the detected character gaps by performing steps including:
        isolating values substantially near maxima values in the histogram of distances, wherein the isolated values are associated with respective detected character gaps;
        creating arcs for each detected character gap;
        assigning a penalty to the arcs;
        creating paths associated with the LDG;

calculating aggregate penalties for each path associated with the LDG based on the penalties assigned to the arcs; and selecting a desired path from among the paths associated with the LDG based on the aggregate penalties associated with the paths.

17. The one or more physical non-transitory computer accessible media of claim 16, wherein the desired path is a 4-connected path.

18. The one or more physical non-transitory computer accessible media of claim 16, wherein the desired path is a path associated with a smallest value of absolute values of the aggregate penalties.

19. The one or more physical non-transitory computer accessible media of claim 16, wherein the assigning of a penalty to the arcs includes assigning a first type penalty or a second type penalty to a respective arc based upon a position of the arc relative to a designated region in the histogram.

20. The one or more physical non-transitory computer accessible media of claim 19, wherein the method further comprises:

determining whether the line of characters includes non-CJK characters by detecting whether any of the arcs associated with the desired path have been assigned a second type penalty.

* * * * *